Patented May 5, 1953

2,637,620

UNITED STATES PATENT OFFICE 2,637,620

METHOD OF DYEING AN ACRYLONITRILE COPOLYMER WITH ACID DYES AND THIOUREA

George E. Ham, Dayton, Ohio, assignor, by mesne assignments, to The Chemstrand Corporation, a corporation of Delaware No Drawing. Application February 27, 1950, Serial No. 146,633

8 Claims. (Cl. 8—55)

This invention relates to a method of dyeing copolymers which are usually non-dyeable. More specifically the invention relates to a procedure for dyeing acrylonitrile polymers which ordinarily are not dye-receptive. Polymers of acrylonitrile, such as polyacrylonitrile and copolymers of 75 or more percent of acrylonitrile and up to 25 percent of other monomers copolymerizable therewith, such as vinyl acetate, methyl methacrylate and methacrylonitrile, are well known to be excellent fiber-forming materials. However, due to poor dye receptivity, these known copolymers are of limited utility and of little value in the preparation of general purpose fibers. In copending application No. 106,490, filed July 23, 1949, by George E. Ham and in application Serial No. 123,093, filed October 22, 1949, by George E. Ham, there are described and claimed non-dyeable acrylonitrile polymers which are capable of chemical reaction with a wide variety of reagents, including trimethylamine and ammonia, whereby the polymers are rendered capable of accepting dyes. This chemical reaction converts the copolymers containing α-chlorocarboxylate radicals into copolymers containing amino or quaternary ammonium salt groups which are believed to be responsible for improved dye receptivity.

The above described dye-receptive copolymers and the methods of preparing them are subject to inherent limitations due to the instability of the spinning solutions. In copending application Serial No. 146,632, filed February 27, 1950, by George E. Ham, there are described and claimed alternative methods of treating copolymers of acrylonitrile and the polymerizable monomers containing α-chlorocarboxylate radicals involving the treatment therewith with thiourea.

The primary purpose of the present invention is to provide a new procedure for preparing dyed fibers from acrylonitrile copolymers. A further purpose of the invention is to provide a means of eliminating the gelation frequently encountered with copolymers of acrylonitrile and unsaturated esters of α-halocarboxylic acids.

Suitable copolymers for the practice of this invention are copolymers of 75 to 98 percent of acrylonitrile and from two to 25 percent of an ester having the structural formula:

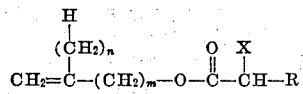

wherein X is a halogen atom of the group consisting of chlorine and bromine, R is a radical of the group consisting of hydrogen and alkyl having up to four carbon atoms, m and n are each whole numbers from zero to one, inclusive, and n is not greater than m. Useful compounds for the practice of this invention include allyl chloroacetate, vinyl chloroacetate, and methallyl chloroacetate. Although the copolymers of 75 to 98 percent of acrylonitrile and from two to 25 percent of the comonomers may be utilized in the practice of this invention, a preferred group of the copolymers are those of 80 to 95 percent acrylonitrile and from five to 20 percent of the said comonomer. The copolymers of 75 to 80 percent acrylonitrile have unusually desirable dye receptivity, but often are found to have less than the optimum fiber forming properties. On the other hand copolymers of 95 to 98 percent acrylonitrile and from two to five percent of the comonomer have unusually good fiber forming properties, but often lack sufficient dye receptivity for general purpose utility.

The reactive copolymers may, if desired, contain small proportions of other monomers copolymerized therewith, for example up to ten percent of styrene, methacrylonitrile, alkyl acrylates, alkyl methacrylates, vinylidene chloride, alkyl fumarates, alkyl maleates or other polymerizable monomer. In general the proportions of other monomers should not be large or either the dyeability or the optimum fiber properties may be lost.

In accordance with the practice of this invention a separate after-treatment of the fibers may be avoided by incorporating the thiourea in the dye bath. By this procedure the chloroacetate substituent is apparently reacted with thiourea and then with the dye in situ, whereby the modification of the copolymers into a dye-receptive form and the reaction with the dye are completed in a single operation. A full range of vivid acid dye colors are thereby developed which are fast to laundering and dry-cleaning operations. The nature of the reaction is not completely understood, however, it is believed to be a chemical reaction between thiourea and the chlorine of the interpolymerized monomer to form a salt having the grouping:

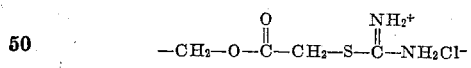

It is believed that anionic exchange then occurs between the ionic halogen and the dye anion. Regardless of the mechanism involved effective economical dyeing is achieved. These salt groups appear to be capable of reacting with acid dyes, particularly the sulfonic acid derivatives, to form a chemically bonded dyestuff which is fast to laundering and dry cleaning.

The thiourea in the dye bath may be present in a wide range of concentrations. Where the fiber is prepared from a copolymer of a substantial proportion of the α-halocarboxylate monomer, or where the dyeing is conducted at elevated temperatures or prolonged periods of time, traces of thiourea will have a pronounced effect. On the other hand where the fibers are prepared from copolymers of a minor proportion of the reactive halogen containing monomer it may be necessary to use large quantities of thiourea, even up to the maximum solubility of thiourea in the dye bath. The higher concentrations are especially useful in dyeing operations involving low temperatures and short immersion periods.

The acrylonitrile copolymers may be prepared by any conventional polymerization procedure, but the preferred practice utilizes suspension polymerization wherein the copolymer is prepared in finely divided form for immediate use in the fiber fabrication operations. The preferred suspension polymerization may utilize batch procedures, wherein monomers are charged with an aqueous medium containing the necessary catalyst and dispersing agents. A more desirable method involves the semi-continuous procedure in which the polymerization reactor containing the aqueous medium is charged with the desired monomers gradually throughout the course of the reaction. Entirely continuous methods involving the gradual addition of monomers and the continuous withdrawal of copolymer may also be employed.

The polymerization is catalyzed by means of any water soluble peroxy compound, for example the potassium, ammonium and other water soluble salts of peroxy acids, sodium peroxide, hydrogen peroxide, sodium perborate, the sodium salts of other peroxy acids, and any other water soluble compound containing a peroxy group (—O—O—). A wide variation in the quantity of peroxy compound is possible. For example, from 0.1 to 3.0 percent by weight of the polymerizable monomer may be used. The catalyst may be charged at the outset of the reaction, or it may be added continuously or in increments throughout the reaction for the purpose of maintaining a more uniform concentration of catalyst in the reaction mass. The latter method is preferred because it tends to make the resultant polymer more uniform in its chemical and physical properties.

Although the uniform distribution of the reactants throughout the reaction mass can be achieved by vigorous agitation, it is generally desirable to promote the uniform distribution of reagents by using inert wetting agents, or emulsion stabilizers. Suitable reagents for this purpose are the water soluble salts of fatty acids, such as sodium oleate and potassium stearate, mixtures of water soluble fatty acid salts, such as common soaps prepared by the saponification of animal and vegetable oils, the "amino soaps," such as salts of triethanolamine and dodecylmethylamine, salts of rosin acids and mixtures thereof, the water soluble salts of half esters of sulfuric acid and long chain aliphatic alcohols, sulfonated hydrocarbons, such as alkyl aryl sulfonates, and any other of the wide variety of wetting agents, which are in general organic compounds containing both hydrophobic and hydrophilic radicals. The quantity of emulsifying agent will depend upon the particular agent selected, the ratio of monomer to be used, and the conditions of polymerization. In general, however, from 0.01 to one percent by weight of the monomers may be employed.

The preferred methods of operation are those which produce a copolymer of very uniform chemical and physical properties. Other characteristics of the copolymer are frequently of great importance, for example the particle size of the dispersion which is primarily concerned with the ease of filtration, the water to monomer ratio which must necessarily be low for the most economical production, and the yield and conversion of the monomers to copolymer.

The emulsion polymerizations are preferably conducted in glass or glass-lined vessels which are provided with a means for agitating the contents. Generally, rotary stirring devices are the most effective means of insuring the intimate contact of the reagents, but other methods may be successfully employed, for example, by rocking or tumbling the reactors. The polymerization equipment generally used is conventional in the art and the adaptation of a particular type of apparatus to the reaction contemplated is within the province of one skilled in the art.

The optimum methods of polymerization for preparing fiber-forming acrylonitrile polymers involve the use of polymerization regulators to prevent the formation of polymer units of excessive molecular weight. Suitable regulators are the alkyl and aryl mercaptans, carbon tetrachloride, chloroform, dithioglycidol and alcohols. The regulators may be used in amounts varying from .001 to two percent on the weight of the monomer to be polymerized.

When the polymerization is complete, the polymer is separated from the aqueous medium by any of the conventionally used methods. If the dispersion is very stable it may be necessary to break the emulsion, for example by adding acids, bases, salts or alcohol. When the optimum procedures above described are used, the polymer may be separated from the aqueous phase by filtration. The resulting polymer in either case may require washing operations to remove traces of soluble catalyst or dispersing agent.

The copolymers of acrylonitrile used in the practice of this invention should be of uniform chemical and physical properties and of relatively high molecular weight. Molecular weights as low as 10,000 may be used but preferred practice involved the use of copolymers with molecular weights between 25,000 and 150,000.

The copolymers of acrylonitrile and the thiourea reactive comonomers are spun into fibers by conventional procedures. The polymers are dissolved in suitable solvents, for example N,N-dimethylformamide, N,N-dimethylacetamide and N,N-dimethylmethoxyacetamide, and the solutions extruded through a suitable die, or a spinneret containing a plurality of apertures into a medium which removes the solvent and percipitates the polymer in a continuous form. The spinning medium may be a liquid medium, for example glycerine, water, or aqueous solutions of salts, acids or bases, or aqueous mixtures of organic liquids, such as glycerine or even liquids which are solvents for the polyacrylonitrile. The use of aqueous mixtures of conventional acrylonitrile polymer solvents produces a fiber of more desirable physical properties than is prepared by precipitation into water alone. The fiber may also be extruded into air or other gaseous medium by conventional dry spinning methods.

Further details of the practice of this invention are set forth with respect to the following specific examples.

*Example 1*

A copolymer of 91 percent acrylonitrile and nine percent of allyl chloroacetate was dissolved in N,N-dimethylacetamide and extruded through a spinneret having 30 apertures, each .0035 inch in diameter, into a mixture of two parts of water and one part of N,N-dimethylacetamide at 40° C. The fiber so prepared was stretched 3.3 times in an atmosphere of steam at 130° C. The fiber was then dyed for thirty minutes at 100° C. in a bath consisting of 60 mls. of water, 1.3 mls. of two percent Wool Fast Scarlet (C. I. 252), 5.9 mls. of three percent sulfuric acid, and 0.1 gram of thiourea. Complete dye bath exhaustion was obtained and the fiber was dyed a deep scarlet. The tensile strength and thermal resistance of the yarn were not affected by the procedure. A sample of the same fiber treated in a similar dye bath without the use of thiourea did not absorb an appreciable amount of the dye. A skein dyed as above with 40% of the fiber weight as thiourea gave dye bath exhaustion in 10 minutes.

*Example 2*

The procedure of the preceding example was duplicated using Alizarin Light Blue 4GL and Wool Fast Yellow, except that 0.2 gram of thiourea were used in the dye bath. Deep shades of colored fibers were thereby prepared.

*Example 3*

The procedure of Example 1 was repeated except that a copolymer of 94.7 percent of acrylonitrile and 5.3 percent of vinyl chloroacetate was used. A one hour dye treatment at 100° C. with a thiourea concentration equivalent to 20% of the fiber weight exhausted the dye bath.

*Example 4*

A copolymer of 95.8% acrylonitrile-4.2% allyl chloroacetate was spun from a 20% solution in dimethylacetamide into a mixture of 67% dimethylacetamide-33% water at 40° C. and stretched in steam at 30 p. s. i. 200%. The fibers were dyed as in Example 1 with Wool Fast Scarlet to which an amount of thiourea equal to the fiber weight was added. The dye bath was exhausted within ten minutes and a bright scarlet fiber was produced.

I claim:
1. A method of dyeing a fiber of a copolymer of 75 to 98 percent by weight of acrylonitrile and from two to 25 percent of a compound having the formula:

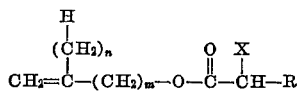

wherein X is an atom of the group consisting of chlorine and bromine, R is a radical of the group consisting of hydrogen and alkyl radicals having up to four carbon atoms, $m$ and $n$ are small whole numbers from zero to one, inclusive, and $n$ is not greater than $m$, which comprises treating the fiber with an aqueous bath of an acid dye containing thiourea.

2. A method of dyeing a fiber of a copolymer of 75 to 98 percent by weight of acrylonitrile and two to 25 percent of allyl chloroacetate, which comprises treating the fiber in an aqueous dye bath of acid dye in the presence of thiourea.

3. A method of dyeing a fiber of a copolymer of 75 to 98 percent by weight of acrylonitrile and two to 25 percent of vinyl chloroacetate, which comprises treating the fiber in an aqueous dye bath of acid dye in the presence of thiourea.

4. A method of dyeing a fiber of a copolymer of 75 to 98 percent by weight of acrylonitrile and two to 25 percent of methallyl chloroacetate, which comprises treating the fiber in an aqueous dye bath of acid dye in the presence of thiourea.

5. A method of preparing a dyed fiber, which comprises treating in an aqueous dye bath of acid dye a fiber of a copolymer of 80 to 95 percent by weight of acrylonitrile and from five to 20 percent of a compound having the formula:

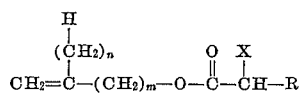

wherein X is an atom of the group consisting of chlorine and bromine, R is a radical of the group consisting of hydrogen and alkyl radicals having up to four carbon atoms, $m$ and $n$ are small whole numbers from zero to one, inclusive, and $n$ is not greater than $m$, said dye bath containing thiourea.

6. A method of preparing a dyed fiber, which comprises treating in an aqueous dye bath a fiber of a copolymer of 80 to 95 percent by weight of acrylonitrile and from five to 20 percent of allyl chloroacetate, said dye bath containing an acid dyestuff and thiourea.

7. A method of preparing a dyed fiber, which comprises treating in an aqueous dye bath a fiber of a copolymer of 80 to 95 percent by weight of acrylonitrile and from five to 20 percent of vinyl chloroacetate, said dye bath containing an acid dyestuff and thiourea.

8. A method of preparing a dyed fiber, which comprises treating in an aqueous dye bath a fiber of a copolymer of 80 to 95 percent by weight of acrylonitrile and from five to 20 percent of methallyl chloroacetate, said dye bath containing an acid dyestuff and thiourea.

GEORGE E. HAM.

References Cited in the file of this patent

UNITED STATES PATENTS

| Number | Name | Date |
|---|---|---|
| 2,332,899 | D'Alelio | Oct. 26, 1943 |
| 2,497,526 | Arnold | Feb. 14, 1950 |